A. COATS AND W. CAMERON.
INTERNAL COMBUSTION ENGINE.
APPLICATION FILED JULY 18, 1910.

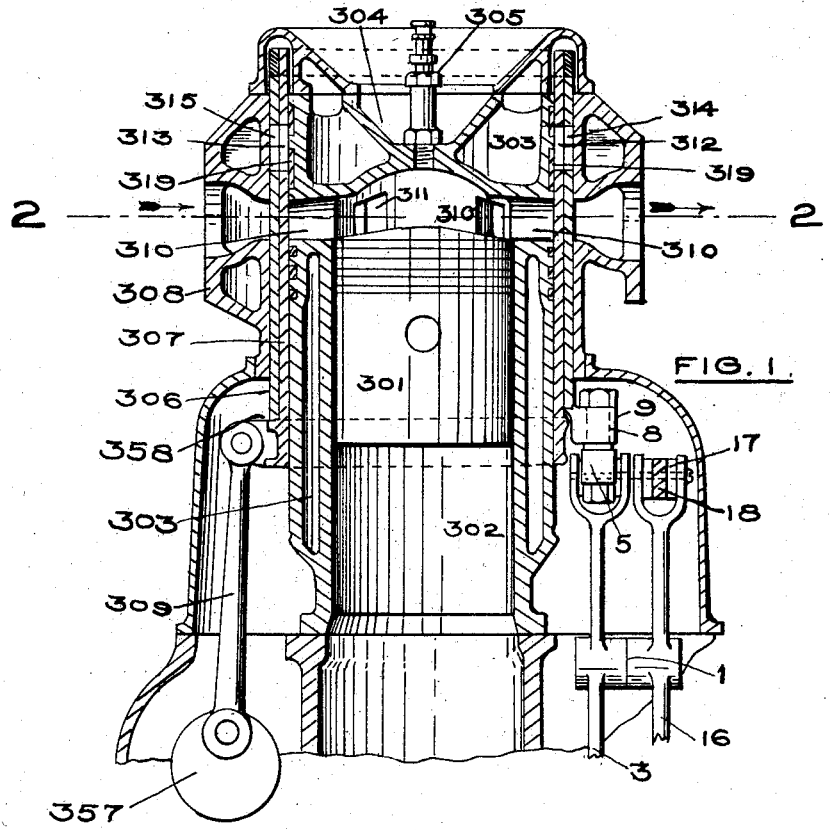
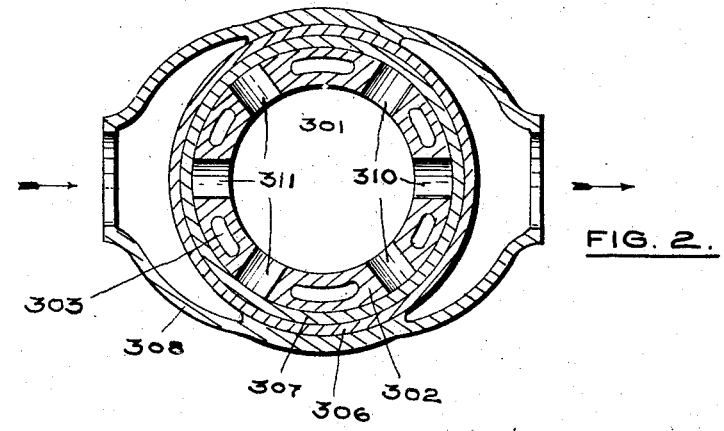

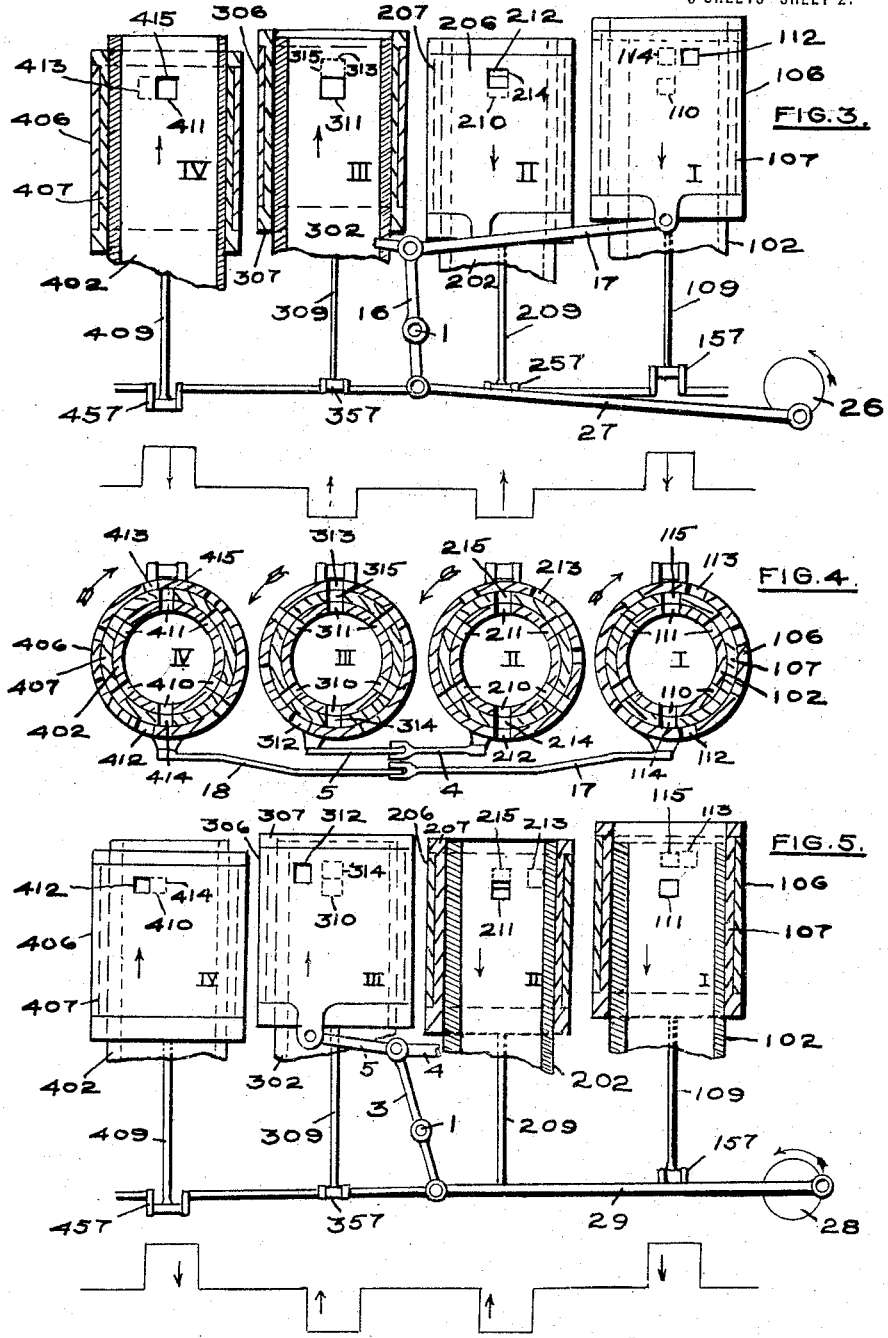

1,364,481. Patented Jan. 4, 1921.
8 SHEETS—SHEET 3.

WITNESSES: INVENTORS:
Allan Coats
and William Cameron,
BY
Russell M. Everett,
ATTORNEY.

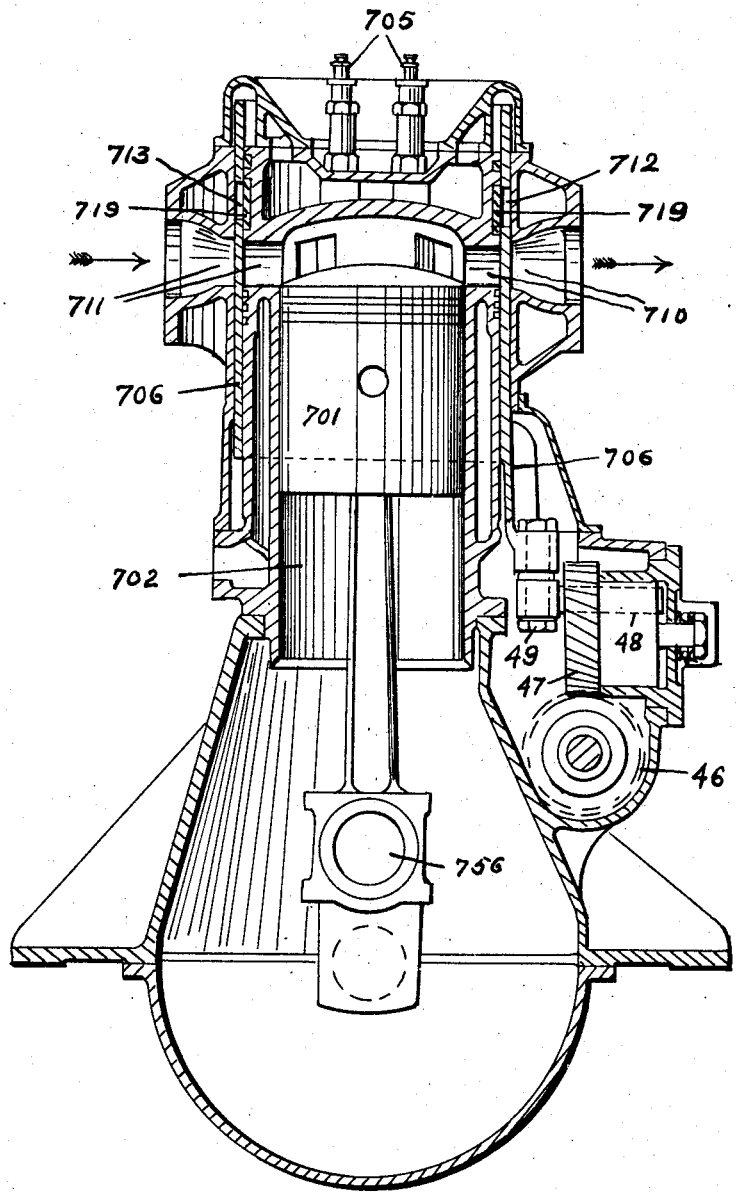

A. COATS AND W. CAMERON.
INTERNAL COMBUSTION ENGINE.
APPLICATION FILED JULY 18, 1910.
1,364,481.
Patented Jan. 4, 1921.
8 SHEETS—SHEET 5.
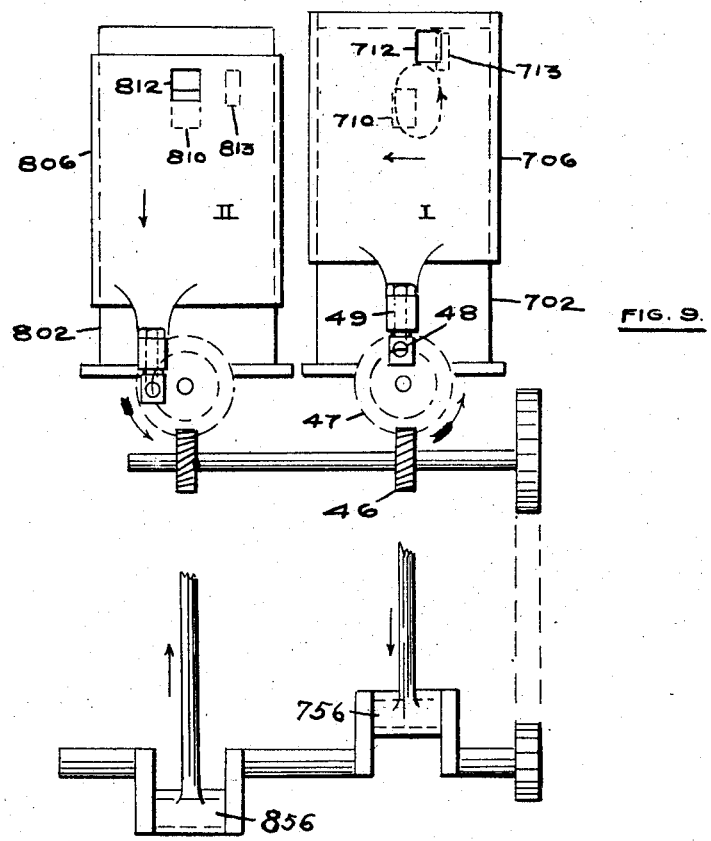
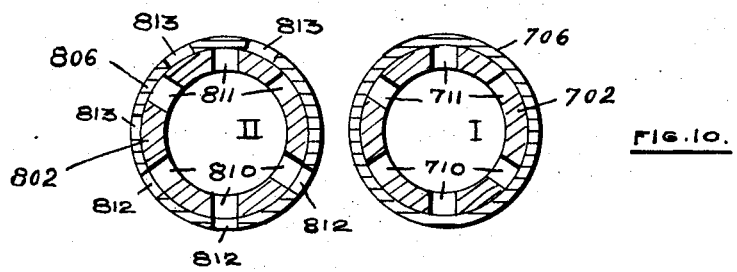
WITNESSES:
INVENTORS:
Allan Coats
and William Cameron;
BY
Russell M. Everett,
ATTORNEY.

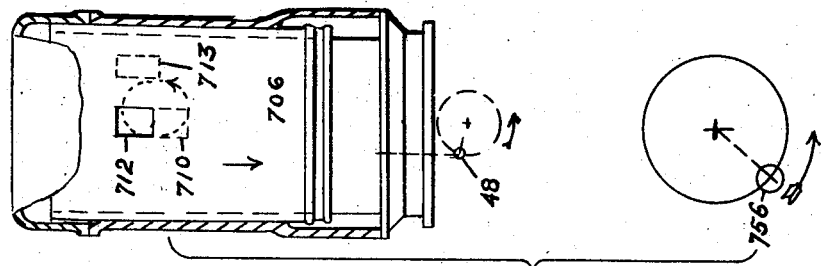
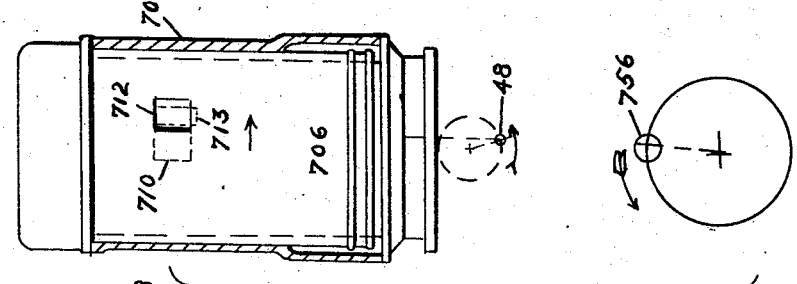
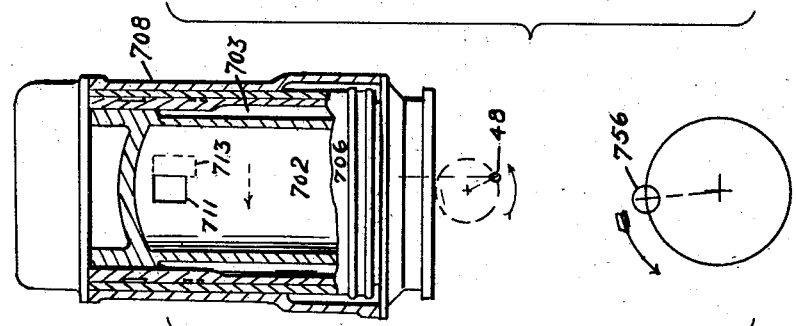
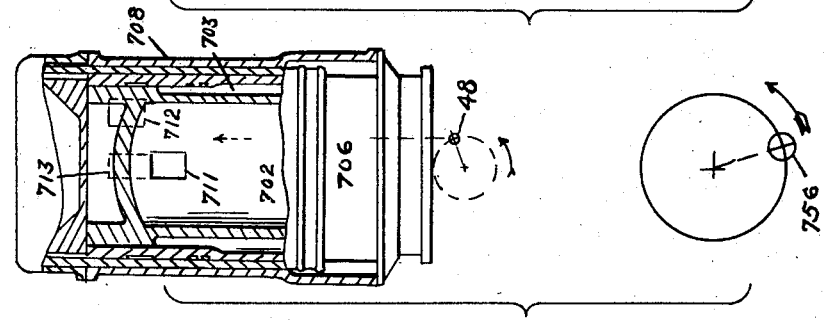

A. COATS AND W. CAMERON.
INTERNAL COMBUSTION ENGINE.
APPLICATION FILED JULY 18, 1910.

1,364,481.

Patented Jan. 4, 1921.
8 SHEETS—SHEET 7.

WITNESSES:
Cornelius Zalneski
Frances E. N. Blodgett.

INVENTORS:
Allan Coats
and William Cameron,
BY
Russell M. Everett,
ATTORNEY.

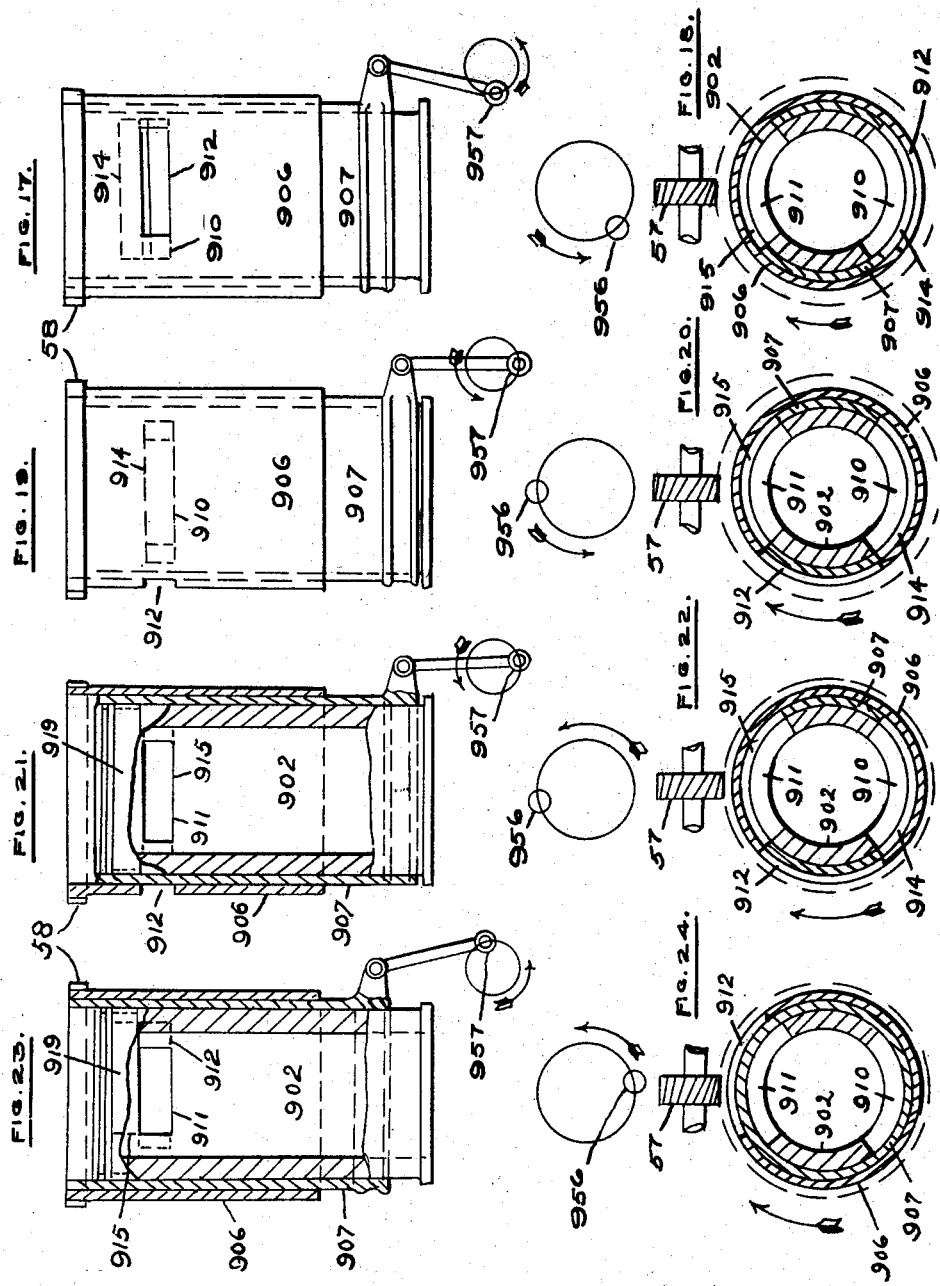

UNITED STATES PATENT OFFICE.

ALLAN COATS, OF NEWARK, NEW JERSEY, AND WILLIAM CAMERON, OF PAISLEY, SCOTLAND.

INTERNAL-COMBUSTION ENGINE.

1,364,481.  Specification of Letters Patent.  Patented Jan. 4, 1921.

Application filed July 18, 1910. Serial No. 572,491.

*To all whom it may concern:*

Be it known that we, ALLAN COATS, a subject of the King of Great Britain, residing at Newark, in the county of Essex, and State of New Jersey, U. S. A., and WILLIAM CAMERON, a subject of the King of Great Britain, residing at Paisley, Scotland, have invented certain Improvements in Internal-Combustion Engines, (for which we have received a patent in Great Britain, No. 16,761, dated July 19, 1909,) of which the following is a specification.

This invention relates especially to means for controlling the inlet and exhaust of internal combustion engines and more particularly such engines of the four-cycle type.

The objects of the invention are to provide a control comprising one or more sleeves in which there are two motions of different kinds, one longitudinally reciprocatory and the other rotary whether the latter be through successive complete rotations or mere oscillations through an arc; to obtain by a combined reciprocating and oscillating motion a movement of the sleeve-valve port in the same direction along its path across the cylinder port; to thus secure such a movement of the sleeve-valve port without turning the sleeve-valve through successive complete rotations; to utilize the reciprocatory motion to control the opening of the exhaust and closing of the suction or inlet, and the rotary motion to control the closing of the exhaust and the opening of the suction; to connect a sleeve valve at its lower end to the drive means so that the most positive and efficient action will be secured; to provide for this purpose an arm inclined radially and longitudinally outward, and to obtain other advantages and results as may be brought out in the following description.

Referring to the accompanying drawings, in which like numerals of reference indicate the same parts throughout the several figures, Figure 1 is a central section of a vertical engine cylinder having two sleeve-valves, the cylinder being the third one of the four-cylinder engine shown in Figs. 3, 4 and 5 with the section taken transversely of the series looking toward the first cylinder;

Fig. 2 is a cross section of the same, taken through the inlet and exhaust ports, on line 2, 2, Fig. 1;

Fig. 3 shows diagrammatically the sleeve-valves of the four cylinders of the engine, together with the operating mechanism for the end sleeve-valves, and illustrates the movements through the firing, exhaust, suction and compression periods of the exhaust ports of the sleeve-valves for the first two cylinders and the inlet ports of the sleeve valves of the last two cylinders, said last two cylinders being in central section for that purpose;

Fig. 4 is a cross-section of the cylinders and sleeve-valves, taken through the inlet and exhaust ports of each cylinder, the operating mechanism being diagrammatically indicated;

Fig. 5 is another view of the sleeve-valves shown in Fig. 3, together with the operating mechanism for the two intermediate sleeve-valves, and similarly illustrates the movements of the inlet ports of the sleeve-valves for the first two cylinders, (which are in central section for that purpose) and the exhaust ports of the last two sleeve-valves;

Fig. 8 is a central section of a vertical engine having a single sleeve-valve and suitable operating mechanism for giving said sleeve-valve both a reciprocating and an oscillating motion;

Fig. 9 is a diagrammatic illustration of the sleeve valves of two cylinders of an engine such as shown in Fig. 8, and operating mechanism therefor;

Fig. 10 is a cross-section of the same, showing the engine cylinders and taken through the inlet and exhaust ports of said cylinders;

Figs. 11 and 12 are diagrammatic elevations of the single sleeve-valve with the sleeve-valve casing in section, Fig. 11 showing the movements of the port at the opening of the exhaust and Fig. 12 at the closing of the exhaust;

Figs. 13 and 14 show diagrammatically the same single sleeve-valve with its casing, itself and the cylinder in central longitudinal section, Fig. 13 illustrating the movement of the port at the opening of suction or inlet and Fig. 14 at the closing of the same;

Figs. 17 and 18 illustrate diagrammatically in elevation and cross-section through the inlet and exhaust ports of the cylinder, respectively, the movement of the ports of the two sleeves shown in Fig. 15 at the opening of the exhaust, the casing for the sleeve-valves being removed;

Figure 6:
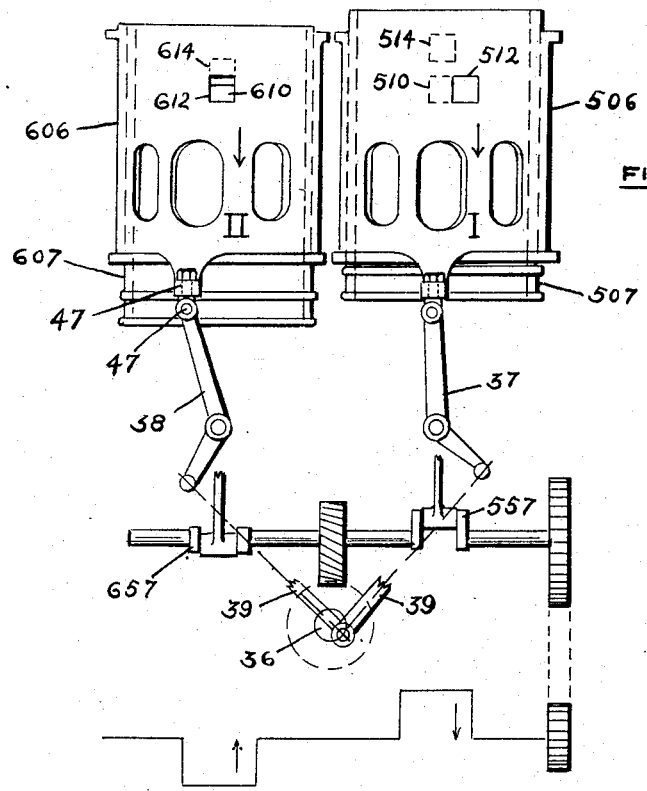
Fig. 6 shows in diagrammatic elevation sleeve-valves of a two cylinder engine similar to the sleeve-valves shown in Figs. 1–5, inclusive, but with a modified form of mechanism for operating them.

Figs. 19 and 20 similarly show the position of the ports at the closing of the exhaust, Figs. 21 and 22 illustrate diagrammatically in longitudinal and cross-section, respectively, of the sleeve-valves and cylinder, the movement of ports at the opening of the suction or inlet, and Figs. 23 and 24 similarly show the position of the ports at the closing of the suction.

In said drawings, and referring particularly to Figs. 1 and 2, 301 indicates the piston of an internal combustion engine working in cylinder 302. Said cylinder is surrounded by a water jacket 303 and has a head 304 in which a spark-plug 305 is mounted as is common. Upon the outside of the cylinder 302 are inner and outer sleeve-valves 307, 306, respectively, and these in turn are inclosed by a casing 308. The cylinder 302 has inlet ports 311 and exhaust ports 310, the inner sleeve has inlet ports 315 and exhaust ports 314, and the outer sleeve has inlet ports 313 and exhaust ports 312. There are preferably a plurality of ports of each kind, as, for instance, three as shown in the drawings and particularly Fig. 2, and the inlet ports of any one set, as well as the exhaust ports of any one set, are adapted to coöperate as hereinafter set forth. Such coöperation is obtained by movement of the inner and outer sleeves 307, 306 with respect to each other and to the cylinder 302, said movements being a longitudinal reciprocation of the inner sleeve 307 and a rotary motion of the outer sleeve 306. Furthermore, the inner sleeve in its reciprocations carries the outer sleeve with it. The outer or rotary sleeve-valve controls the opening of the suction and closing of the exhaust, while the inner or reciprocating sleeve-valve controls the closing of the suction and the opening of the exhaust, the cycle of port movements produced by the two motions controlling the cylinder ports in proper sequence to effect the operation of the engine.

We have shown the inner sleeve-valve 307 reciprocated by means of a rod 309 extending to a crank or eccentric 357 and the outer sleeve-valve 306 rests at its lower edge upon a shoulder 358 of the inner sleeve-valve so as to move therewith. The rotary motion is given to the outer sleeve-valve 306 by means of a lever 3 fulcrumed as at 1 and having its upper end pivoted to links 4, 5 which extend to the two intermediate units of the four-cylinder engine of which the third unit is shown in Figs. 1 and 2. The link 5 is connected to the outer sleeve 306 by means of a vertical pin 8 extending through said link and an arm 9 of the sleeve-valve overlying the said link. A similar lever 16 is also fulcrumed as at 1 and serves to reciprocate other links 17, 18 which extend to the end units of the four-cylinder engine and connect to the outer sleeve-valves thereof. These levers 3 and 16 are each swung by a suitable crank or eccentric not shown which crank or eccentric, as well as crank or eccentric 357 which reciprocates the inner sleeve-valve, may be driven from the engine crank-shaft by any suitable means such as will cause them to make one revolution while the engine crank-shaft makes two revolutions.

The exhaust ports 312, 314 and inlet ports 313, 315 in the sleeve-valves 306 and 307 are at the proper time caused by the above-mentioned movements to register with each other and with the exhaust ports 310 and inlet ports 311 in the cylinder for the purpose of exhausting and admitting the working fluid from and to the cylinder. During the compression and firing strokes or periods of the engine cycle the exhaust ports 312, 314 and inlet ports 313, 315 in the sleeve-valves 306, 307 are above the ports 310, 311 in the cylinder, and on the spring ring 319 for the purpose of preventing leakage from the cylinder. The exhaust port 312 and the inlet port 313 in the outer sleeve-valve 306 are caused to register with the exhaust and inlet ports 314 and 315 in the inner sleeve-valve 307 by the partial rotation in alternate directions of the outer sleeve-valve 306, while the reciprocating movement given to the inner sleeve-valve 307 brings the ports 312, 314 and 313, 315 to register with the exhaust port 310 and inlet port 311 in the cylinder, respectively. The reciprocating movement also places the ports 312, 314, 313 and 315 onto the spring ring 319.

Referring now to Figs. 3, 4 and 5, these diagrammatically illustrate what is known as a four-cylinder engine, having sleeve-valves and operating gear arranged as in Fig. 1. For clearness in Figs. 3 and 5, only one inlet and exhaust port is indicated. The units are designated by Roman numerals I, II, III and IV.

In Fig. 3, an outside elevation of units I and II is shown in order to show the movements of the exhaust ports, and in Fig. 5 a sectional elevation of the valve-sleeve of the same units is shown in order to show the movements of the inlet ports. In Fig. 3 a sectional elevation of units III and IV shows the inlet ports, and in Fig. 5 an outside elevation of the sleeve-valves of units III and IV show their exhaust ports. The outside sleeve valves 106 and 406 of units I and IV, Fig. 3, receive a partial rotary movement in alternate directions from the lever 16 being connected thereto by the links 17, 18. The movements are derived from the eccentric or crank 26 which is coupled to the lever 16 by the connecting rod 27. The outside sleeve-valves 206 and 306 of units II and III are coupled-up to an eccentric or crank 28, by the links 4, 5, lever 3, and connecting rod 29, the movements being similar to those of the sleeve-valves of units I and IV. At the same time each sleeve valve is partially rotating it receives a reciprocating movement from its crank or eccentric 157, 257, 357, or 457. Fig. 4 illustrates diagrammatically a cross section through the exhaust and inlet ports of the cylinders and sleeve-valves of the units.

Referring to unit I, Figs. 3, 4 and 5, which is commencing its firing stroke or period of its cycle, the exhaust ports 112, 114 in the sleeve-valves 106, 107 are now above the exhaust port 110 in the cylinder and on the spring ring 119, see Fig. 1.

The inlet ports 113, 115 in the sleeve valves 106, 107 are also above the inlet port 111 in the cylinder and on the spring ring 119; both exhaust and inlet ports in the outer sleeve-valve are out of register with those of the inner sleeve-valve. The exhaust port 112 in the outer sleeve is however being rapidly brought into register with the exhaust port 114 in the inner sleeve-valve 107, while the inlet port 113 in the outer sleeve-valve is being taken farther out of register with the inlet port 115 at the same rate. During this time both sleeve valves are slowly moving downward, the two movements, reciprocating and rotary, bringing the exhaust ports 112 and 114 into their position with regard to the exhaust port 110 in the cylinder for the exhaust period of the engine cycle.

Referring to unit II, Figs. 3, 4 and 5, this unit has completed its firing stroke and the exhaust period of its cycle has begun. Previous to this, and before the reciprocating movement given to the sleeve-valve 207 has brought the lower edges of the exhaust port 214 off the spring ring 219, the partial rotary movement given to the outside sleeve-valve 206 by the eccentric or crank 28 has brought the exhaust ports 212, 214 in the two sleeve-valves into about full registration with each other. At the commencement of the exhaust period of the engine cycle the rapid downward movement of the inner sleeve 207, and in which the outer sleeve-valve participates, brings the ports 212 and 214 in the sleeve valves off the spring ring 219 and into register with the exhaust port 210 of the cylinder, thus quickly opening the exhaust by the reciprocating movement given to the inner sleeve-valve 207.

During the exhaust period of the engine cycle the inlet port 215 in the inner sleeve 207 is in registration with the inlet port 211 in the cylinder, but communication between the cylinder and inlet pipe is prevented by the port 213 in the outer sleeve-valve 206 being far out of register with the port 215 in the inner sleeve-valve. Toward the end of the exhaust period the rotary movement, which is still in the direction of the arrow, Fig. 4, becomes rapid, and at the end of the exhaust communication between the cylinder and exhaust pipe is closed by the edge of the exhaust port 212 in the outer sleeve-valve rapidly closing the exhaust port 214 in the inner sleeve which is still in about full register with the exhaust port 210 in the cylinder. The closure of the exhaust is thus brought about by the rotary movement given to the outer sleeve 206. The same rapid rotary movement is also bringing the inlet port 213 in the outer sleeve into register with the inlet port 215 in the inner sleeve-valve 207, the port 215 being in about full register with the inlet port 211 in the cylinder.

Unit IV, Figs. 3, 4 and 5, has just completed its exhaust stroke or period, and is about to begin with the suction or inlet period of its cycle. Both exhaust and inlet ports 414 and 415 in the inner sleeve-valve 407 are in about full register with the exhaust and inlet ports 410 and 411 in the cylinder, and both sleeve-valves 406, 407 are moving very slowly upward. The outer sleeve-valve 406 is rapidly moving in the direction of the arrow, Fig. 4. The exhaust port 412 has just moved out of register with the exhaust port 414 in the inner sleeve-valve and the inlet port 413 in the outer sleeve is just about to enter into register with the inlet port 415 in the inner sleeve. Thus the closing of the exhaust port 414 and opening of the inlet port 415 is brought about by the rotary movement in the direction of the arrow, Fig. 4, of the outer sleeve valve 406. Near the end of the inlet period of the engine cycle the inlet port 413 in the outer sleeve valve 406 is in full register with the inlet port 415 in the inner sleeve-valve 407 and the sleeve-valve 406 is moving very slowly, but at about this time the inner sleeve 407 attains its maximum upward velocity and in this the outer sleeve 406 participates. At the end of the inlet period the inlet port 415 in the inner sleeve-valve 407 passes out of register with the inlet port 411 in the cylinder and on to the spring ring 419, thus closing the suction port 411 by the reciprocating movement of the inner sleeve-valve 407.

Referring to unit III, Figs. 3, 4 and 5, which is at the end of its suction stroke or period and about to begin the compression of its cycle, the inlet port 311 in the cylinder has just been closed by the port 315 in the inner sleeve valve 307 passing above it and on to the spring ring 319. During the compression period the ports 313, 315, 312 and 314 move upward farther on to the spring ring 319 and the inlet port 313 in the outer sleeve-valve moves in the direction of the arrow, Fig. 4, out of register with the inlet port 315 in the inner sleeve-valve 307, while the exhaust port 312 moves in the direction of the arrow, Fig. 4, coming closer to the port 314 in the inner sleeve-valve 307. At the end of the compression period the ports 314 and 315 in the inner sleeve-valve have the same positions with respect to the ports 310, 311 in the cylinder as those shown in unit I, Figs. 3 and 5, while the ports 312 and 313 in the outer sleeve occupy the same position vertically as to the ports 310 and 311 in the cylinder but lie on the other side of the vertical center lines of the ports 310 and 311.

The resultant path of any two ports of the same set in the sleeve-valve, in relation to a port of that set in the cylinder, is of the same order as that indicated in Fig. 9, but the form of the path depends upon the relative extent of the reciprocating and rotary movements given.

Figure 7:
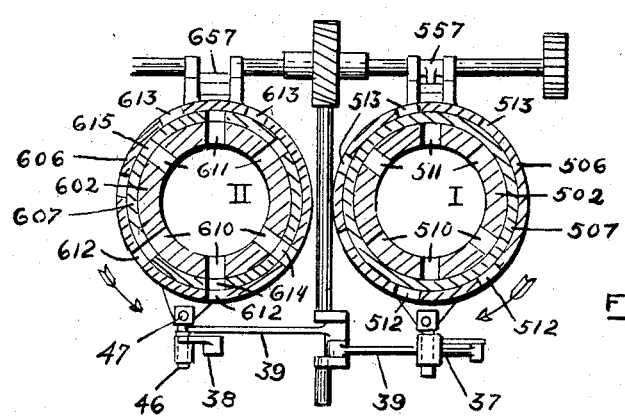
Fig. 7 is a transverse section of the same, showing the engine cylinders and taken through the inlet and exhaust ports of said cylinders.

Figs. 6 and 7 illustrate diagrammatically another construction of operating mechanism whereby we effect our cycle of valve or port movements. In this combination the outer sleeve-valve 506 is so fixed that a partial rotary movement only is given it, and in consequence the ports 512 and 513 in the outer sleeve always remain in the same horizontal plane as the ports 510 and 511 in the cylinders, instead of remaining in the same horizontal plane as the ports 514, 515 of the inner sleeves, as they do in the combination illustrated by Figs. 3, 4 and 5. Figs. 6 and 7 illustrate two units of an engine which may consist of any number of such pairs, the two units shown being denoted by the Roman numerals I and II. The outside sleeve-valve 506 or 606 receives a partial rotary movement from the crank or eccentric 36 which is coupled to the levers 37, 38, by the links 39. The sleeve-valves 506, 606 being connected to the levers 37, 38 by sliding pins 46 in the eye of each of which a pin 47 is free to move, the said pin is secured to the sleeve-valve 506 or 606. The inner sleeve-valves 507, 607 are reciprocated by the cranks or eccentrics 557, 657.

Referring to unit I, Figs. 6 and 7, which is commencing the firing stroke or firing period of its cycle, the outer sleeve-valve 506 is being quickly moved in the direction of the arrow, Fig. 7, and the exhaust port 512 is being brought into a position so that it will at the end of the firing period register with the exhaust port 510 in the cylinder and 514 in the inner sleeve-valve. During the firing period the port 514 in the inner sleeve is moving downward with an increasing velocity, and toward the end of this period its velocity reaches a maximum, when the port 514 leaves the spring ring, and begins to register with the port 512 in the outer sleeve-valve and 510 in the cylinder, thus opening the exhaust port 510 by the reciprocatory movement given to the inner sleeve-valve 507.

Referring to unit II, Figs. 6 and 7, which has completed its firing stroke or period and has commenced the exhaust period of the cycle, the port 614 in the inner sleeve-valve 607 has moved down until its lower edge is off the spring ring and is now in part register with port 612 in the outer sleeve-valve 606 and with port 610 in the cylinder. The sleeve-valve 607 has now about its greatest downward velocity and at the end of the exhaust period the port 614 is in about full register with the port 610 in the cylinder, and its velocity is about a minimum. About this time the rotary movement of the outside sleeve valve 606 brings the exhaust-port 612 out of register with the exhaust ports 614 and 610, thus bringing about the closure of the exhaust by the rotary movement of the outer sleeve valve 606.

The cycle of valve or port movements for effecting the engine cycle in the combination illustrated by Figs. 6 and 7 is precisely the same as in the combination illustrated by Figs. 3 to 5. Whether the exhaust port of the outer sleeve-valve partially rotates in the plane of the exhaust port of the inner sleeve or in the plane of the exhaust port of the cylinder does not in the slightest affect the cycle, for the reason that when the closure of the exhaust and opening of the suction periods is effected by the partial rotation of the outside sleeve-valve, all the ports are in practically the same plane, and as the closing of the suction and opening of the exhaust periods are effected by the reciprocating movement given to the inner sleeve it is immaterial whether the exhaust port of the outer sleeve valve is in register with the exhaust port in the inner sleeve valve or exhaust port in the cylinder.

Fig. 8 illustrates a vertical section of an engine provided with one sleeve-valve and gear whereby the sleeve valve receives two movements, one being reciprocating and the other a partial rotation in order to perform the function of two such sleeve-valves as shown in Figs. 1 to 7 inclusive. The spiral wheel 46 which is driven from the engine crank shaft in any suitable manner gears into the wheel 47 whose revolutions are one-half that of the engine crankshaft. Wheel 47 is provided with a crank pin 48 which is free to move in the direction of its axis, and has an eye formed on its end through which passes a pin 49 secured to the sleeve-valve 706. The pin 49 is free to partly rotate about the axis of the hole in the crank pin 48, and thus as the outer sleeve valve is oscillated the said pin 49 can turn slightly in said hole or eye of the crank pin 48 as it follows its curved path. The crank pin 48 can also slide in and out to accommodate this same curvature.

The sleeve valve is preferably provided with an arm which extends outward both radially and longitudinally of the cylinder to receive the pin 49, this arm being thus inclined in side view as shown in Fig. 8. This gives on the upstroke of the crank pin a much greater strength and positiveness of motion, and avoids binding or undue strain from the sleeve.

The movement which is given to the sleeve valve 706 by the crank pin 49 causes the exhaust port 712 and the inlet port 713 to register at the proper times with the exhaust and inlet ports 710 and 711 in the cylinder for the purpose of exhausting and admitting the working fluid from and to the cylinder. During the compression and firing strokes or periods the exhaust and inlet ports 712, 713 are placed above the ports 710 and 711 and on to the spring ring 719. We do not bind ourselves to the details of the drive shown, as for instance the pin 48 may be integral with the spiral wheel 47 and slide in a suitable hole in pin 49, the wheel 47 may rotate on a central pin instead of as shown, or any other means may be used to give the sleeve valve 706 the described motion.

Figs. 9 and 10 illustrate diagrammatically a side elevation of two units of an engine which may consist of any number of such units, each unit being of the construction shown in detail in Fig. 8. The units are denoted by the Roman numerals I and II, and only one exhaust and suction port is shown in the sleeve-valves and cylinder in Fig. 9, for clearness.

Referring to unit I, Figs. 9 and 10, this unit has just completed its compression stroke or period and is entering on the firing period of its cycle. The exhaust port 712 and the inlet port, 713, are both above the exhaust and inlet ports 710, 711 of the cylinder, and on the spring ring (not shown), the rotary part of the movement which the sleeve valve 706 has is rapidly bringing the exhaust port 712 into line with the exhaust port 710 in the cylinder, and at the same time, the said movement is rapidly taking the inlet port 713 farther out of alinement with the inlet port 711 in the cylinder. As the firing stroke proceeds and toward the end of that period, the reciprocating component of the combined movement given to the sleeve-valve predominates and both exhaust and inlet ports are rapidly taken off the spring ring, but only the exhaust port 712 is in alinement with its cylinder port 710. Therefore at the end of the firing period, the exhaust port 712 begins to register with the exhaust-port 710 in the cylinder, thus opening the exhaust port by the reciprocating component of the combined movement.

Referring to unit II, Figs. 9 and 10, this unit has completed its firing stroke or period and is on the exhaust period of its cycle. The reciprocating movement still predominates and the sleeve-valve 806 has now about its maximum downward velocity, and as the exhaust period of the engine cycle proceeds, the exhaust port 812 passes downward into full register with exhaust port 810 in the cylinder. The rotary component of the combined movement now predominates, its direction is changed and toward the end of the exhaust period the movement is purely rotary. At about this time the exhaust period of the unit's cycle is closed by the edge of the exhaust port 812 in the sleeve-valve passing out of register with the port 810 in the cylinder, it being remembered that the sleeve-valve is moving from right to left when looking at exhaust port 812. Shortly after the closing of the exhaust port 810 in the cylinder, the edge of the inlet port 813 passes the edge of the inlet port 811 in the cylinder and the inlet ports 813 and 811 in the sleeve-valve and cylinder begin to register, the ports 813 and 812 being still in the same horizontal plane as ports 810 and 811. The exhaust period is thus closed and the inlet or suction period opened by the rotary movement of the sleeve-valve 806.

Figs. 11 to 14, inclusive, illustrate diagrammatically one cycle of the valve or port movements with reference to one unit such as shown in Figs. 8, 9 and 10, the position of the ports in the sleeve-valve in relation to those in the cylinder being indicated for the opening and closing of the exhaust period of the unit's cycle and for the opening and closing of the inlet or suction period of the unit's cycle. The position of the ports in the sleeve-valve during the compression and firing periods is indicated in Fig. 9 on unit I. Figs. 11 and 12 are part sectional elevations of a cylinder for a unit such as shown by Figs. 8, 9 and 10, the section being through the sleeve valve casing in order to show the exhaust-port 712 in the sleeve-valve. Figs. 13 and 14 are sectional elevations of the said cylinder, the section being through the center line of the sleeve valve-casing, sleeve-valve and cylinder in order to show the inlet ports more clearly. Only one inlet and exhaust port is indicated to avoid confusion, but the number and location of the ports in sleeve valve and cylinder are as indicated in Fig. 10.

Referring to Fig. 11, the unit has completed its firing period and is about to commence its exhaust period, its crank pin 756 is moving in the direction of the arrow. The sleeve crank pin 48 is moving in the direction of the arrow and the path of a point on the inner surface of the sleeve-valve is shown by the ellipse. When the unit's crank pin 756 and the sleeve-valve crankpin 48 occupy the positions indicated, the movement of the sleeve-valve is practically in a vertical direction as the reciprocating component of the combined motion predominates, and at this instant its downward velocity is a maximum. The exhaust-port 712 in the sleeve is rapidly moving off the spring ring 719 and coming into register with the exhaust 710 in the cylinder, thus opening the exhaust port 710 in the cylinder by the reciprocating movement of the sleeve-valve. As the exhaust period of the unit's cycle proceeds, the reciprocating component of the combined movement disappears and at about the end of this period the movement of the sleeve-valve is practically purely rotary. The sleeve-valve's crank-pin 48 having reached the position shown in Fig. 12, the unit's crank pin 56 is also in the position indicated in the Fig. 12. The sleeve-valve is now moving in the direction of the arrow with about its greatest velocity, rapidly closing the exhaust port 710 in the cylinder by the edge of the exhaust port 712 in the sleeve-valve passing the edge of the exhaust port 710. On the crank pins 756 and 48 moving farther around in the indicated directions, the exhaust port is completely closed and the inlet port 713 begins to register with the inlet port 711 in the cylinder. This is shown in Fig. 13. From the position of the sleeve-valve crank pin 48 it is obvious that the rotary component of the combined movement still greatly predominates and that the movement of the sleeve-valve is still practically purely rotary. As the inlet port 713 is situated about diametrically opposite the exhaust port 712, see Fig. 10, it moves as shown by the dotted arrow in Fig. 13. Thus the closing of the exhaust period and opening of the inlet or suction period of the unit's cycle is brought about by the rotary movement of the sleeve-valve. As the suction or inlet period of the unit's cycle proceeds, the rotary component of the combined movement disappears and when the crank pins 756 and 48 reach the positions indicated in Fig. 14, the movement of the sleeve-valve 706, as will be obvious from the position of its crank-pin 48, is practically in a vertically upward direction, the motion at this instant being purely a portion of a reciprocating movement. The sleeve-valve has now about its greatest upward velocity and the inlet port 713 is rapidly taken out of register with the inlet port 711 in the cylinder and placed on the spring ring 719, thus closing the suction period of the engine cycle by the reciprocating movement of the sleeve-valve. On the closure of the inlet port 710, the unit enters on the compressing period of its cycle and as this period progresses the reciprocating component of the combined movement disappears, and at about the end of the said period the motion of the sleeve-valve is practically purely rotary and in the opposite direction from that shown in Figs. 12 and 13, being now in the direction of the arrow shown in Fig. 9, unit I. On this Fig. 9 is shown the position of ports 713, 712 which are as before mentioned on the spring ring 719 and the unit is just entering on the firing period of its cycle at the end of which the sleeve-valve 706, its ports 712 and 713, and crank pin 48 again occupy the positions shown in Fig. 11.

Figure 15:
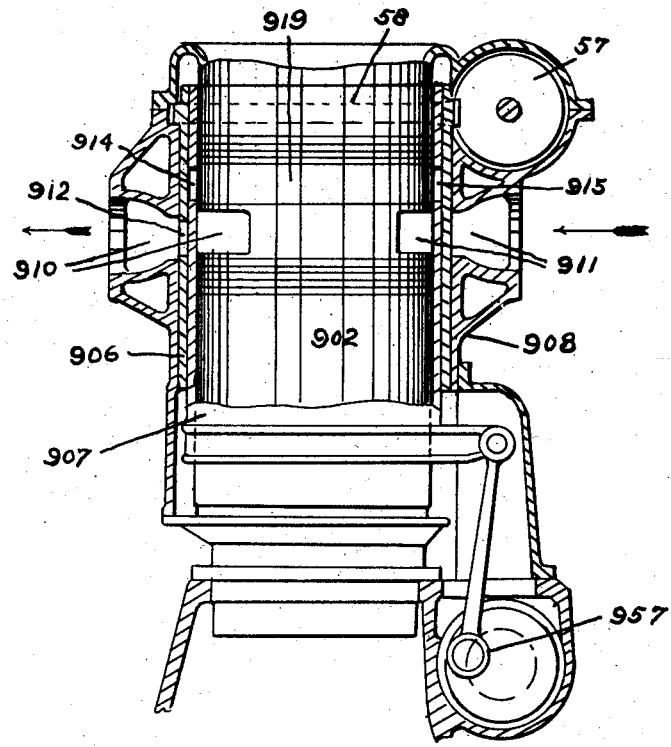
Fig. 15 is a view partially in central section of an engine having two sleeve-valves one of which reciprocates and the other rotates in one direction continuously on the outside of the reciprocating one, and means for operating said sleeve-valves.
Figure 16:
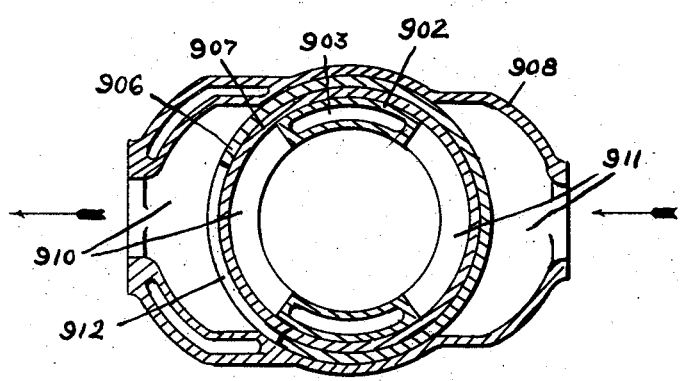
Fig. 16 is cross-section of the same taken through the inlet and exhaust ports of the cylinder.

Figs. 15 and 16 illustrate still another combination whereby we attain our cycle of valve or port movements. In this combination we give the outside sleeve-valve 906 a complete rotary movement in one direction, therefore the port 912 in the outside sleeve-valve serves for both an exhaust and inlet port as it is caused to register at the proper periods with the exhaust 910 and inlet port 911 in the cylinder. The outside sleeve-valve 906 is driven by a wheel 57 which gears with a wheel 58 secured to the sleeve-valve. The wheel 57 is driven from the engine crank-shaft in any suitable manner, and the sleeve 906 makes one-half the revolutions of the said crank-shaft. The inner sleeve-valve is reciprocated by the crank 957, which may be driven in any suitable manner and must make one-half the revolutions of the engine crank-shaft.

The engine is shown entering the exhaust period of its cycle. The port 912 in the outside sleeve-valve 906 has been placed in register with the port 910 in the cylinder and is moving in the direction of the arrow. The inner sleeve-valve 907 intervenes and the exhaust period of the engine cycle does not begin until the exhaust port 914 in the inner sleeve-valve moves down off the spring ring 919 and registers with the ports 910 and 912. At the same time port 913 also begins to register with the inlet port 911 in the cylinder, but communication between the port 911 and the inlet pipe is prevented by the outer sleeve-valve 906.

Referring to Figs. 17-24, these show our cycle of valve or port movements with reference to an engine such as is shown in Figs. 15 and 16, consisting of a single unit. An engine may consist of any number of such units. Figs. 17 and 19 illustrate diagrammatically elevations of the sleeve valves and cylinder of a unit, the valve casing being removed showing the exhaust ports; Figs. 21 and 23 illustrate diagrammatically sectional elevations, being sections partially through the center of the sleeve-valves and cylinder, showing the suction ports; and Figs. 18, 20, 22 and 24 are cross sections through the exhaust and inlet ports of the cylinders and show the position of the ports in each sleeve-valve in relation to each other and to the ports in the cylinder. The unit illustrated by Figs. 17 and 18 has completed the firing period of its cycle and has entered its exhaust period. The position of its crank pin 956 is shown, and the direction in which the pin is moving is shown by the arrow. The position of the crank pin 957 for the sleeve-valve 906 is also shown and the direction in which said outer sleeve valve is turning is denoted by the arrow in Fig. 18. The port 912 in the outer sleeve-valve has for some time before the end of the unit's firing period been in part register with the exhaust port 910 in the cylinder, but the sleeve-valve 907 has blocked the passage until at the end of the firing period the port 914 in the inner sleeve passes down off the spring ring and allows a passage, as shown in Figs. 17 and 18, between the ports 910 and 912. Thus the exhaust port is opened by the reciprocating movement given to the inner sleeve-valve 907. At this time said inner sleeve-valve is traveling downward with about its greatest velocity, and the port 914 rapidly passes into full register with the port 910 in the cylinder.

At the end of the exhaust period of the unit's cycle, the crank pin 956 and the crank 957 of the sleeve-valve 907 have reached the position shown in Fig. 19. Referring to Figs. 19 and 20, which illustrate the closing of the exhaust period of the unit's cycle, the exhaust port 914 and the inlet port 915 in the inner sleeve-valve are now in full register with their respective ports in the cylinder, but the outer sleeve-valve 906 has moved around in the direction of the arrow, Fig. 20, and the following edge of the port 912 in said sleeve-valve has just closed the exhaust port 914 in the inner sleeve-valve. Thus the exhaust period of the unit's cycle is closed by the rotary movement of the outer sleeve 906. As will be seen on reference to Fig. 20, the inlet ports 911 and 912 are still closed by the sleeve-valve and they remain so until the cranks 956 and 957 reach the position shown in Fig. 21.

Referring to Figs. 21 and 22, which illustrate the commencement of the inlet period of the unit's cycle, the exhaust and inlet ports 914 and 915 in the inner sleeve-valve 907 are still in about full register with their ports 910 and 911 in the cylinder, and the inner sleeve-valve 907 is now very slowly moving upward. The outside sleeve-valve 906 is moving in the direction of the arrow, Fig. 20, and the leading end of port 912 is just about to open the inlet port 915 in the inner sleeve and port 911 in the cylinder. The inlet or suction period of the unit's cycle is thus opened by the rotary movement of the outer sleeve-valve.

Referring to Figs. 23 and 24, which illustrate the end of the inlet or suction period of the unit's cycle, the cranks 956 and 957 have reached the positions shown, and the outer sleeve-valve 906 has moved around in the direction of the arrow, Fig. 24, until its port 912 is in full register with the inlet port 911 in the cylinder. From the position of the crank 957 it will be obvious that the inner sleeve-valve 907 has about its maximum upward velocity at this time. The inlet port 915 in that sleeve-valve has just passed out of register with the inlet port 911 in the cylinder and port 912 in the outer sleeve-valve, and on to the spring ring 919, thus closing the inlet or suction period of the unit's cycle. During the compression period of the unit's cycle the crank 957 reaches its highest upward position, placing the inlet or exhaust ports 915 and 914 in the inner sleeve-valve 907 farther on the spring ring 919. During the firing period the inner sleeve-valve 907 with its inlet and exhaust ports 915 and 914 is moving downward, and at the end of this period the ports again reach the positions shown in Fig. 17.

During the above-mentioned compression and firing periods the port 912 in the outer sleeve-valve 906 moves around in the direction of the arrow in Fig. 24, and at the end of the firing period it reaches the position shown in Fig. 18, being again in full register with the exhaust-port 910 in the cylinder.

Instead of the construction just described and shown in Figs. 15 to 24, inclusive, where two sleeve-valves are employed, one of which is reciprocated longitudinally and the other rotated continuously in one direction, we could obviously use a single sleeve-valve and give the same both a reciprocatory motion and also a rotary motion continuously in the same direction. This could be done by fitting on the sleeve-valve, preferably at its lower end, a ring or band and coupling to this by means of a connecting rod a crank pin or eccentric caused to turn at one-half the engine speed. The ring or band would encircle the sleeve-valve and be connected thereto in such a manner as would enable the reciprocating motion to be transmitted to the sleeve-valve and yet leave the sleeve-valve free to turn within the ring or band, means being provided to hold the ring or band against turning. The continuous rotary motion could be given to the sleeve-valve by means of an annular rack and pinion driven from the engine crank-shaft in any suitable manner which would cause the sleeve-valve to make one-half the revolutions of the engine crank-shaft, and in somewhat the same manner as is shown in Fig. 15. The annular rack or wheel would, however, be slidably connected to the sleeve-valve and suitable feathers or projections provided in order to transmit the rotary movement, the rack being held in the casing against any endwise movement. The sleeve-valve would have a single port serving for both exhaust and inlet purposes as it was caused to register at proper times with the exhaust port and inlet port of the cylinder.

This construction would bear about the same relation to that shown in Figs. 15 to 24 as the construction shown in Figs. 8 to 14 bears to the construction of Figs. 1 to 7, inclusive, the difference between Figs. 8 to 14, and the device of Figs. 1 to 7 consisting in giving to a single sleeve the motions which in Figs. 1 to 7 inclusive are imparted to separate sleeves.

We are aware that various other modifications of construction could be made without departing from the spirit and scope of our invention, as for example, using scroll cones instead of links and levers to produce movements of the sleeve-valves, and we do not wish to be understood as limiting ourselves to any particular means of obtaining the cycle of valve or port movements herein described except as the state of the art may require.

We have shown the sleeve-valves upon the outside of the cylinder and there are certain advantages in this, such as ease of access, better cooling, etc. At the same time we wish it understood that the sleeve-valve or sleeve valves could be located upon the inside of the cylinder, and still our new cycle of valve or port movements secured with success. In any case, the rotary sleeve-valve is always outside the reciprocating sleeve-valve.

Furthermore, we would have it understood that although we have in every case shown the spring ring to be above the exhaust and inlet ports in the cylinder, we may place the spring ring below these ports, in which case the downward part of the reciprocating movement given to the inner sleeve valve would determine the closure of the inlet or suction period of the engine cycle, and the upward part of the said movement determine the opening of the exhaust period of the engine cycle. The crank or eccentric operating the said sleeve-valve would turn in the opposite direction to that shown by the arrows, while the position of the crank or eccentric operating the sleeve-valve would, with reference to the engine crank pin at the beginning of a period in the engine cycle, be altered.

In every instance, when the sleeve-valves or valve, are, or is, performing that portion of their, or its, cycle which effects the closure of the exhaust period and opening of the suction or inlet period of the engine cycle, the rotary movement of the sleeve-valve is in one direction, in those combinations where the rotary movement is changed in direction, that change takes place when the ports in the sleeve-valve, or valves, or those in the reciprocating sleeve-valve, are above the ports in the cylinder and on the spring ring, that is, during the compression and firing periods of the engine cycle.

It will be noted that because of the two motions of different kinds which are given the adjacent sleeves where we use two of them or which are imparted to the single sleeve-valve when we use one, distribution of lubricant upon the two contacting surfaces is greatly facilitated, and so a more perfect lubricating secured than by a purely reciprocating or purely rotary motion.

Having thus described our invention, what we claim is:

1. The combination with a cylinder of an internal combustion engine having inlet and exhaust ports, of a sleeve control adapted to provide ports one to register with the said inlet port of the cylinder and another to register with the said exhaust port of the cylinder, said control ports having edges extending transversely of the cylinder and other edges extending longitudinally of the cylinder, and means for causing transverse edges of said control ports to open the exhaust and close the inlet and longitudinal edges of said control ports to close the exhaust and open the inlet.

2. The combination with a cylinder of an internal combustion engine having inlet and exhaust ports, of a sleeve in axial coincidence with said cylinder and having ports adapted to register with said ports of the cylinder, said sleeve ports having edges extending transversely of the cylinder and other edges extending longitudinally of the cylinder, and means for causing transverse edges of said sleeve ports to open the exhaust and close the inlet and longitudinal edges of said sleeve ports to close the exhaust and open the inlet.

3. In an internal combustion engine, the combination with a cylinder, of a sleeve valve therefor having an arm extending outward both radially and longitudinally with respect to the cylinder, and means for imparting motion to said arm to give the sleeve a combined reciprocating and oscillating movement, whereby the inclined position of said arm secures strength and positive movement.

4. In an internal combustion engine, the combination with a cylinder in vertical or upright position, of a sleeve valve therefor having an arm extending both radially outward and longitudinally downward with respect to the cylinder, whereby it occupies an inclined or oblique position, and means for imparting motion to said arm to give the sleeve a combined reciprocating and oscillating movement.

ALLAN COATS.
WILLIAM CAMERON.

Witnesses as to Allan Coats:
  FREDERICK GERMANN, Jr.,
  RUSSELL M. EVERETT.
Witnesses as to William Cameron:
  LEN. JOSEPH SHORTER,
  CHARLES LESLIE SHERRATT.